United States Patent
Autenrieth et al.

(10) Patent No.: US 6,231,831 B1
(45) Date of Patent: May 15, 2001

(54) HYDROGEN SEPARATING MEMBRANE, METHANOL REFORMATION SYSTEM EQUIPPED THEREWITH, AND OPERATING METHOD THEREFOR

(75) Inventors: Rainer Autenrieth, Erbach; Thomas Poschmann, Ulm; Steffen Wieland, Stuttgart; Dietmar Heil, Hoerenhausen; Stefan Boneberg, Blaustein, all of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/210,894

(22) Filed: Dec. 16, 1998

(30) Foreign Application Priority Data

Dec. 16, 1997 (DE) .............................. 197 55 813
Dec. 23, 1997 (DE) .............................. 197 57 506

(51) Int. Cl.$^7$ .............................. B01D 53/22; C01B 3/02; C01B 3/26
(52) U.S. Cl. .................. 423/648.1; 48/127.9; 95/56; 96/11; 422/180; 423/652
(58) Field of Search .................. 423/648.1, 652, 423/653, 654; 95/55, 56; 422/177, 180; 48/127.9; 96/11

(56) References Cited

U.S. PATENT DOCUMENTS

| | | | |
|---|---|---|---|
| 2,958,391 | * 11/1960 | De Rosset | 96/11 |
| 3,278,268 | * 10/1966 | Pfefferle, Jr. | 423/652 |
| 3,350,846 | * 11/1967 | Makrides et al. | 423/652 |
| 3,630,690 | 12/1971 | Coppola. | |
| 4,175,153 | 11/1979 | Dobo et al. | 428/398 |
| 4,971,696 | * 11/1990 | Abe et al. | 96/11 |
| 4,981,676 | 1/1991 | Minet et al. . | |
| 5,134,109 | 7/1992 | Uchiyama et al. | 423/652 |
| 5,215,729 | * 6/1993 | Buxbaum | 423/648.1 |
| 5,229,102 | 7/1993 | Minet et al. . | |
| 5,451,386 | 9/1995 | Collins et al. . | |
| 5,674,301 | 10/1997 | Sakai et al. . | |
| 5,738,708 | * 4/1998 | Peachey et al. | 96/11 |
| 5,980,989 | * 11/1999 | Takahashi et al. | 96/11 |

FOREIGN PATENT DOCUMENTS

| | | |
|---|---|---|
| 44 23 587 | 1/1996 | (DE) . |
| 6-40703 | * 2/1994 | (JP) . |
| 06 345408 | 12/1994 | (JP) . |
| 07 017701 | 5/1995 | (JP) . |

OTHER PUBLICATIONS

Patent Abstracts of Japan, 06345408 A, Shirasaki Yoshirnori et al., Dec. 20, 1994.
Patent Abstracts of Japan, 07017701 A, Eguchi Koichi et al., Jan. 20, 1995.

* cited by examiner

*Primary Examiner*—Wayne Langel
(74) *Attorney, Agent, or Firm*—Evenson, McKeown, Edwards & Lenahan, P.L.L.C.

(57) ABSTRACT

A membrane for separating hydrogen from a gas mixture is provided on at least one side with a catalyst layer for a specific catalytic combustion process. A methanol reformation system so equipped can be brought rapidly to operating temperature, with the hydrogen-separating membrane being heated directly by performing the catalytic combustion process.

12 Claims, 1 Drawing Sheet

HYDROGEN SEPARATING MEMBRANE, METHANOL REFORMATION SYSTEM EQUIPPED THEREWITH, AND OPERATING METHOD THEREFOR

This application claims the priority of German Patent Application Nos. 197 55 813.5, filed Dec. 16, 1997, and 197 57 506.4, filed Dec. 23, 1997, the disclosures of which are expressly incorporated by reference herein.

BACKGROUND AND SUMMARY OF THE INVENTION

The present invention relates to a membrane for the separation of hydrogen from a gas mixture; a methanol reformation system equipped with such a membrane; and a method for operating such a system.

A known technique for obtaining highly pure hydrogen consists in producing a gas mixture containing hydrogen from suitable starting substances by means of a corresponding chemical reaction and then separating the hydrogen from this mixture using a hydrogen separating membrane. The hydrogen separating membrane is designed so that only hydrogen gas can diffuse through it. An important area of application consists of reformation systems for obtaining hydrogen, for example, systems for steam reformation of methanol.

As a result of the reformation reaction of a suitable hydrocarbon, including hydrocarbon derivatives such as methanol, a reformate gas containing hydrogen is produced from which the hydrogen is separated using a hydrogen separation stage. The hydrogen separation stage contains a hydrogen separating membrane as an essential element. In methanol reformation systems, as disclosed in U.S. Pat. Nos. 4,981,676 and 5,229,102, the hydrogen separation stage is integrated into the reformation reactor stage so that the hydrogen separating membrane forms a side wall of the reactor that delimits the reformation reaction chamber. Alternatively, the hydrogen separation stage can also be in the form of an independent unit connected downstream from the reactor stage.

Recently, increasing numbers of reformation systems have been proposed for obtaining hydrogen for mobile applications, especially for obtaining hydrogen for the fuel cells of a fuel-cell-operated motor vehicle. This has the advantage that no cumbersome hydrogen storage is required in the vehicle. Instead, the hydrocarbon that is used as the starting material for the reformation reaction, especially methanol, is carried in liquid form, which is very safe. Especially for motor vehicle applications, it is desirable to supply hydrogen from the reformation system in sufficient quantities as soon as possible after the vehicle and the hydrogen producing reformation system are started, so that the fuel cell system can deliver the required driving power for the vehicle correspondingly promptly.

Since most reformation reactions that supply hydrogen proceed at a temperature that is higher than room temperature, as for example, the hydrogen reformation of methanol that is particularly important for use in vehicles, it is already known to heat the reformation reaction chamber at least during cold-start phases. Thus, the system disclosed in U.S. Pat. No. 4,981,676 has a gas burner unit in which a suitable fuel/air mixture supplied to it is burned with an open flame on the outside of a cylindrical exterior wall of the reaction chamber, which is in the form of a cylindrical ring. The reaction chamber is delimited radially inward by the hydrogen separating membrane in the form of a hollow cylinder. As an alternative to burners with an open flame, it is known to heat the reaction chamber by using a catalytic flame-free combustion process or by subjecting it to the flow of a hot gas or liquid stream generated outside the reactor. Another known technique is to provide an external heat source for the reactor, as disclosed in U.S. Pat. No. 5,674, 301.

JP 06-345408 A discloses a methanol reformation reactor of the plate stack type in which a hydrogen removal layer is bounded on both sides by a membrane plate, whose opposite side a reformation catalyst layer abuts in each case. The reformation catalyst layers are abutted on their sides that are opposite the hydrogen removal membrane plate by a combustion catalyst layer. In these combustion catalyst layers, catalytic combustion can be performed in order to heat the reactor and especially the reformation catalyst layers that form the reformation reaction chamber.

The present invention poses as the technical problem to be solved the provision of a hydrogen separating membrane, a methanol reformation system equipped therewith, and an operating method therefor with improved cold start behavior, in which the operating temperature is reached as rapidly as possible.

According to the present invention, the hydrogen separating or permeable membrane is provided on at least one side with a catalyst layer for a specific catalytic combustion process. By subjecting the membrane on this side to a flow of reactants of the catalytic combustion process, the catalytic combustion process occurs, thereby heating the hydrogen separating membrane directly. Thus, in a methanol reformation system according to an embodiment of the present invention, the hydrogen separation stage can be brought very rapidly to operating temperature by means of the direct flameless heating of the hydrogen separating membrane.

If the hydrogen separation stage is integrated with the reactor stage, the reaction chamber will then be heated directly. In addition, depending on the requirement, direct heating of the reaction chamber in one of the conventional ways can also be advantageous. While in the conventional procedure, only the reaction chamber is heated directly, a heat loss of the reformation product gas that passes from the reaction chamber into the hydrogen separation stage occurs during cold start phases because the hydrogen separation stage must initially heat the hydrogen separating membrane which is still cold. This heat loss can advantageously be avoided by heating the membrane directly catalytically according to the present invention. As a result, the system as a whole can be brought to operating temperature more rapidly, something which is desirable in mobile applications, such as motor vehicles operated by fuel cells. It is precisely in this application that it may be necessary to activate the hydrogen separation stage initially in a cooled resting state following a shutoff of the system, which can take place according to the present invention very rapidly and with comparatively little expense.

A hydrogen separating membrane according to an embodiment of the present invention is coated with a catalyst layer that catalyzes a catalytic combustion process for hydrogen and/or methanol. This is especially advantageous for reformation systems that generate hydrogen, such as methanol reformation systems. In methanol reformation systems, the hydrogen or methanol is present because of the reforming system and therefore no additional other fuel needs to be provided for the catalytic combustion process for heating the membrane.

Other objects, advantages and novel features of the present invention will become apparent from the following

DETAILED DESCRIPTION OF THE DRAWINGS

Figure 1:
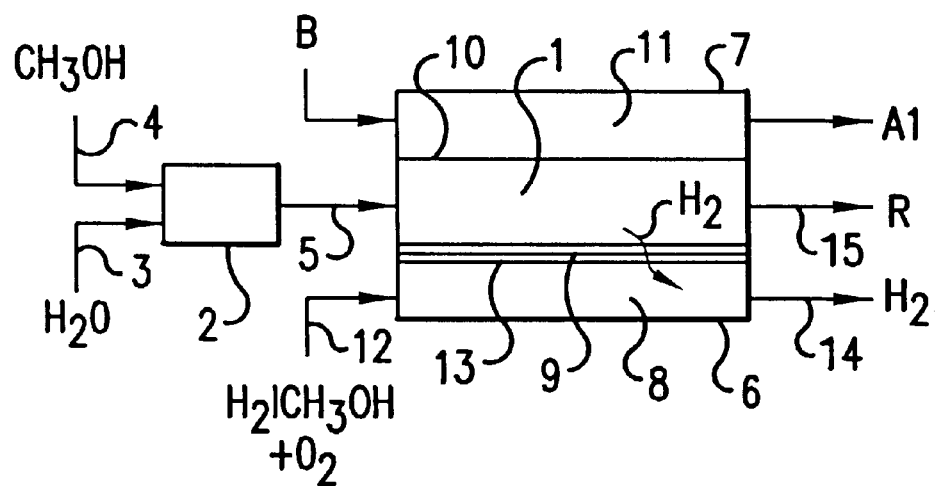
FIG. 1 is a schematic block diagram of a methanol reformation system suitable for use in a motor vehicle operated by fuel cells, in the cold start operating state.

FIG. 1 is a schematic illustration of a methanol reformation system for obtaining hydrogen for a fuel cell system of a motor vehicle, showing the components of interest in this regard during operation in a cold start phase. The system incorporates as the central part a reactor stage with a reaction chamber 1 that is charged with a catalyst pellet load suitable for catalyzing a hydrogen reformation reaction of methanol. An evaporator 2 is connected upstream from the reactor stage. The evaporator is supplied through a first feed line 3 with liquid water and through a second feed line 4 with liquid methanol from respective supply tanks, not shown. The two liquids are evaporated in evaporator 2 to form a methanol/steam mixture 5 that is supplied at a sufficiently high temperature to reaction chamber 1.

On one side of reaction chamber 1 is a hydrogen separation stage 6 and on the other side a catalytic burner 7, both of which are integrated with reaction chamber 1 to form a common reformation reactor unit. The hydrogen separation stage 6 includes a hydrogen collecting chamber 8 and a hydrogen separating membrane 9 that functions as the boundary wall of reaction chamber 1 opposite hydrogen collection chamber 8. Hydrogen separating membrane 9 is so designed that, of the gas components present in reaction chamber 1, it allows only the generated hydrogen to diffuse through selectively. For this purpose, it consists of a suitable material, for example, palladium or a palladium alloy. On the other side, reaction chamber 1 is separated from a heating chamber 11 of catalytic burner 7 by a partition 10 which is impermeable to gas but is a good heat conductor. Evaporator 2 has a suitable heating device for generating the methanol/steam mixture 5, for example an electrical heating element or a burner. In the case of a burner, the burner may possibly be integrated on the evaporator side with the catalytic burner 7 adjoining reaction chamber 1 to form a common burner unit, if desired.

Hydrogen-separating membrane 9 is characteristically coated on the side facing hydrogen collecting chamber 8 with a catalyst layer 13 that catalyzes a flameless combustion process of hydrogen and/or methanol with oxygen. Catalyst layer 13 can consist of any of the materials known for this purpose, for example platinum, and is so applied that it is not significantly affected adversely by the diffusion of the hydrogen through membrane 9. This can be accomplished, for example, by using a catalyst material that is likewise permeable to hydrogen or by applying the catalyst layer 13 with a sufficiently limited thickness and/or not over the entire surface area, but as a porous layer or in a structured form, leaving uncoated areas of the surface, for example as lattice patterns.

With the aid of catalyst layer 13, the hydrogen-separating membrane 9 can be heated directly, with the side of the membrane coated in such fashion being subjected to a flow of a corresponding combustion gas mixture (i.e., a mixture of oxygen or a gas containing oxygen and hydrogen and/or methanol). If necessary, a membrane can be used that is provided on both sides with such a catalyst layer and this membrane can be subjected to the flow of the corresponding combustion gas mixture on both sides. The membrane can also be made in a cylindrical form. In addition, a plurality of membranes in plate or disk form can be combined to make a membrane module.

During operation in a cold-start phase illustrated in FIG. 1, a suitable fuel B is supplied to heating chamber 11 of catalytic burner 7 and is burned catalytically there without a flame. The methanol that is carried in liquid form in the vehicle or the hydrogen produced in a previous operating phase, or any other material can be used as fuel B. On the outlet side of burner heating chamber 11, the corresponding combustion gas Al is removed. The combustion heat produced in catalytic burner 7 passes through heat-conducting partition 10 into reaction chamber 1 and there heats the charge of catalyst pellets to an operating temperature that is sufficient for steam reformation of methanol. At the same time, a catalytically combustible gas mixture composed of (1) oxygen, and (2) hydrogen and/or methanol is conducted through an inlet line 12 into hydrogen collecting chamber 8. This gas mixture burns catalytically without a flame on the side of the hydrogen-separating membrane 9 that is provided with the corresponding catalyst layer 13 and faces hydrogen collecting chamber 8. The combustion heat thus produced heats the hydrogen-separating membrane 9 directly to an operating temperature.

Evaporator 2 feeds methanol/steam mixture 5 to reaction chamber 1 at a rate that is still relatively low during the cold start operating phase. The rate is capable of being raised as the operating temperature of the reactor stage increases, so that the supplied mixture is always reformed completely. Starting at a temperature of approximately 100° C., the hydrogen that is thus produced in reaction chamber 1 is passed through hydrogen-separating membrane 9 into hydrogen collecting chamber 8 from which it is removed by an outlet line 14 and conducted to a fuel cell system, for example. The hydrogen-separating membrane 9 prevents the other components of the reformation product gas produced in reaction chamber 1 from passing through, especially the carbon monoxide that acts as a fuel cell poison, so that these remaining components R leave the reaction chamber 1 through an outlet line 15. Before the required operating temperature is reached, the hydrogen can be burned in catalytic burner 7.

Figure 2:
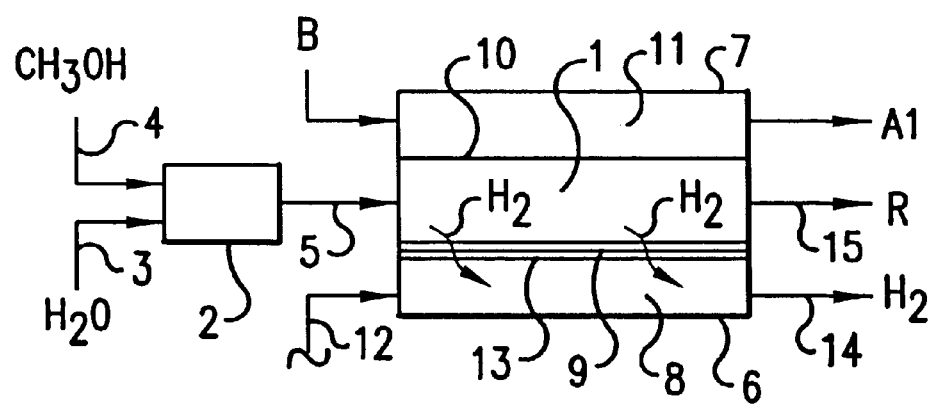
FIG. 2 is a view corresponding to FIG. 1 but with the operating state of the system following warm-up.

As a result of the direct heating of the reaction chamber and the hydrogen-separating stage 6, especially the hydrogen-separating membrane 9, the reformation system reaches its operating temperature comparatively quickly, typically within a few seconds. The system is switched to the operation illustrated in FIG. 2. The introduction of the gas mixture composed of oxygen and hydrogen and/or methanol into hydrogen collecting chamber 8 for catalytic combustion on the hydrogen-separating membrane is terminated so that only the hydrogen which is still being formed in reaction chamber 1 and diffusing selectively through membrane 9 collects in hydrogen collecting chamber 8 and is passed on through the corresponding outlet 14. Since the reactor stage has now reached its operating temperature and hence its full performance, water and methanol can now be evaporated and preferably superheated at a high rate that depends on the particular power requirement, as a suitable mixture 5 to reaction chamber 1. Since the steam reformation of methanol proceeds endothermally, the operation of catalytic burner 7 is maintained in order to keep reaction chamber 1 at the most favorable operating temperature. To maintain the operating temperature of hydrogen-separating membrane 9 in this warmed-up operating state of the system, the transport of heat from catalytic burner 7 and of the methanol/steam mixture 5 that is supplied superheated to the reaction chamber is sufficient, which is favored by the fact that membrane 9 directly abuts reaction chamber 1.

Of course a hydrogen-separating membrane of the type according to the present invention can be used not only as shown above in methanol reformation systems, especially for fuel-cell-operated motor vehicles, but is also valuable in other areas of application wherever there is a need for direct heating of the membrane by a catalytic combustion process. The membrane, as described, can be part of a hydrogen-separating stage that is integrated with the reactor stage or alternatively can be used in a water separating stage that is separate from the reactor stage. As a result of the catalytic combustion process at the membrane, no additional means of any kind are required for heating it, such as an electrical heating device, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coated membrane for a hydrocarbon reformation system, comprising:
    a membrane for separating hydrogen from a gas mixture; and
    a coating on at least one side of the hydrogen separating membrane, said coating comprising a layer of a combustion catalyst for catalyzing combustion of a gas stream, wherein said layer is a porous layer or a structured layer leaving uncoated areas of the surface of said at least one side of the hydrogen separating membrane.

2. A coated membrane according to claim 1, wherein the combustion catalyst layer comprises a material that catalyzes combustion of a compound selected from the group consisting of hydrogen, methanol, and a combination thereof.

3. A coated membrane according to claim 1, wherein the hydrogen separating membrane comprises palladium or a palladium alloy.

4. A coated membrane according to claim 1, wherein the combustion catalyst layer comprises platinum.

5. A methanol reformation system, comprising:
    a hydrogen-separating stage for separating hydrogen from a reformate gas, wherein the hydrogen separating stage comprises a hydrogen separating membrane coated on at least one side with a layer of a combustion catalyst, wherein said layer is a porous layer or a structured layer leaving uncoated areas of the surface of said at least one side of the hydrogen separating membrane.

6. A methanol reformation system comprising a reformation reaction unit comprising:
    a catalytic burner;
    a reformation reactor for reforming a methanol and steam mixture to produce a reformate gas containing hydrogen; and
    a hydrogen-separating stage for separating the hydrogen from the reformate gas, wherein the hydrogen separating stage comprises a hydrogen separating membrane coated on at least one side with a layer of a combustion catalyst, wherein said layer is a porous layer or a structured layer leaving uncoated areas of the surface of said at least one side of the hydrogen separating membrane.

7. A methanol reformation system according to claim 6, further comprising an evaporator for producing a methanol and steam mixture.

8. A methanol reformation system according to claim 6, wherein the combustion catalyst layer comprises a material that catalyzes combustion of a compound selected from the group consisting of hydrogen, methanol, and a combination thereof.

9. A methanol reformation system according to claim 6, wherein the hydrogen separating membrane comprises palladium or a palladium alloy.

10. A methanol reformation system according to claim 6, wherein the combustion catalyst layer comprises platinum.

11. A method for operating a methanol reformation system, comprising:
    providing a hydrogen separating membrane in said methanol reformation system, said hydrogen separating membrane having a layer of a combustion catalyst on at least one side thereof, wherein said layer is a porous layer or a structured layer leaving uncoated areas of the surface of said at least one side of the hydrogen separating membrane;
    during a cold start, before an operating temperature of the system is reached, subjecting the catalyst layer to a gas stream flow; and
    catalytically combusting the gas stream, thereby heating the hydrogen separating membrane to the operating temperature.

12. A method according to claim 11, further comprising:
    providing a catalytic burner in thermal communication with a reformation reactor chamber;
    supplying fuel to the catalytic burner; and
    catalytically combusting the fuel, thereby heating the reformation reaction chamber to the operating temperature.

* * * * *